United States Patent
Zhou et al.

(10) Patent No.: US 10,404,181 B2
(45) Date of Patent: Sep. 3, 2019

(54) SYSTEM AND METHOD FOR INTEGRATING HYBRID ENERGY STORAGE INTO DIRECT CURRENT POWER SYSTEMS

(71) Applicant: General Electric Company, Schenectady, NY (US)

(72) Inventors: Zhi Zhou, Selkirk, NY (US); Di Zhang, Niskayuna, NY (US); Dong Dong, Schenectady, NY (US); Tomas Sadilek, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 15/237,870

(22) Filed: Aug. 16, 2016

(65) Prior Publication Data

US 2018/0145600 A1 May 24, 2018

(51) Int. Cl.
*H02M 3/335* (2006.01)
*H02J 1/10* (2006.01)
*H02J 9/00* (2006.01)
*H02J 7/34* (2006.01)
*H02J 1/00* (2006.01)
(Continued)

(52) U.S. Cl.
CPC ........... *H02M 3/33576* (2013.01); *H02J 1/10* (2013.01); *H02J 1/102* (2013.01); *H02J 7/345* (2013.01); *H02J 9/00* (2013.01); *H02J 7/0013* (2013.01); *H02J 2001/002* (2013.01); *H02M 2001/0077* (2013.01); *H02M 2007/4835* (2013.01)

(58) Field of Classification Search
CPC ..... H02M 3/33576; H02M 2007/4835; H02M 2001/0077; H02J 7/345; H02J 1/10; H02J 9/00; H02J 1/102; H02J 7/0013; H02J 2001/002
See application file for complete search history.

(56) References Cited

U.S. PATENT DOCUMENTS 7,456,513 B2 11/2008 Meyers et al.
7,615,889 B2 11/2009 Willets et al.
(Continued)

OTHER PUBLICATIONS

Zhang, L., et al., "Interlinking modular multilevel converter of hybrid AC-DC distribution system with integrated battery energy storage," IEEE Energy Conversion Congress and Exposition (ECCE), pp. 70-77 (Sep. 2015) (Abstract).
(Continued)

*Primary Examiner* — Rexford N Barnie
*Assistant Examiner* — Thai H Tran
(74) *Attorney, Agent, or Firm* — Armstrong Teasdale LLP

(57) ABSTRACT

A modular power conversion device includes at least one first-type energy storage device (ESD) configured to induce a first direct current (DC) voltage, and at least one active power link module (APLM) string coupled to the at least one first-type ESD. The at least one APLM string includes a plurality of APLMs coupled to each other. Each APLM of the plurality of APLMs has a plurality of switching devices including a first switching device and a second switching device coupled to each other in electrical series. Each APLM of the plurality of APLMs also has at least one second-type ESD coupled in electrical parallel with both of the first switching device and the second switching device. The at least one second-type ESD is configured to induce a second DC voltage.

24 Claims, 9 Drawing Sheets

(51) Int. Cl.
   *H02J 7/00*      (2006.01)
   *H02M 1/00*     (2006.01)
   *H02M 7/483*    (2007.01)

(56) References Cited

U.S. PATENT DOCUMENTS

| | | |
|---|---|---|
| 7,642,755 B2 | 1/2010 | Bartilson |
| 7,994,657 B2 | 8/2011 | Kimball et al. |
| 8,446,037 B2 | 5/2013 | Williams |
| 8,737,074 B2 | 5/2014 | Yang et al. |
| 8,922,054 B2 | 12/2014 | Sihler et al. |
| 2009/0091302 A1 | 4/2009 | Rusan et al. |
| 2010/0109344 A1 | 5/2010 | Conway et al. |
| 2013/0328541 A1* | 12/2013 | Euler .................. H02H 7/1225 323/311 |
| 2014/0152109 A1 | 6/2014 | Kanakasabai et al. |
| 2015/0108091 A1 | 4/2015 | Öberg et al. |
| 2015/0130420 A1 | 5/2015 | Fassnacht et al. |
| 2015/0316033 A1 | 11/2015 | Rosmann et al. |
| 2016/0020628 A1* | 1/2016 | Guo ..................... H02J 7/0065 307/72 |
| 2016/0056710 A1 | 2/2016 | Häfner et al. |

OTHER PUBLICATIONS

International Search Report and Written Opinion issued in connection with corresponding PCT Application No. PCT/US2017/29750 dated Feb. 13, 2018.

\* cited by examiner

SYSTEM AND METHOD FOR INTEGRATING HYBRID ENERGY STORAGE INTO DIRECT CURRENT POWER SYSTEMS

STATEMENT REGARDING FEDERALLY SPONSORED RESEARCH & DEVELOPMENT

This invention was made with Government support under contract number N00014-14-C-0103 awarded by the United States Office of Naval Research. The Government may have certain rights in this invention.

BACKGROUND

The field of the disclosure relates generally to electrical power conversion and electrical energy storage systems, and, more specifically, to systems and methods for integrating hybrid energy storage into direct current (DC) power systems.

In at least some known systems and methods for integrating energy storage devices (ESDs) into DC power systems, ESDs such as ultracapacitors positioned in current paths of bi-directional DC-to-alternating current (AC) converters experience undesirable AC ripple currents which degrade ESDs' performance, longevity, and power quality. To increase efficiency of power conversion where ESDs are exposed to AC currents in such known systems and methods, ESDs are over-sized to manage heat, which increases size, weight, and cost in addition to lowering specific power density.

Also, in at least some known systems and methods for integrating ESDs into DC power systems, non-modular topologies such as buck-boost converter architectures are limited in attainable switching frequencies and dynamic responsiveness, and also present challenges related to fault isolation and tolerance. In the event of a fault in such "centralized" power conversion systems and methods, electrical loads supported thereby require shutdown until system repairs are made, and such repairs are costly and time-consuming in at least some known systems and methods, and they may require a complete re-design and re-build of the power converter for affected load devices.

BRIEF DESCRIPTION

In one aspect, a modular power conversion device is provided. The modular power conversion device includes at least one first-type energy storage device (ESD) configured to induce a first direct current (DC) voltage, and at least one active power link module (APLM) string coupled to the at least one first-type ESD. The at least one APLM string includes a plurality of APLMs coupled to each other. Each APLM of the plurality of APLMs has a plurality of switching devices including a first switching device and a second switching device coupled to each other in electrical series. Each APLM of the plurality of APLMs also has at least one second-type ESD coupled in electrical parallel with both of the first switching device and the second switching device. The at least one second-type ESD is configured to induce a second DC voltage.

In another aspect, a modular power converter system is provided. The modular power converter system includes at least one electrical load device, and a modular power conversion device electrically coupled to the at least one electrical load device. The modular power conversion device includes at least one first-type ESD configured to induce a first DC voltage, and at least one APLM string coupled to the at least one first-type ESD. The at least one APLM string includes a plurality of APLMs coupled to each other. Each APLM of the plurality of APLMs has a plurality of switching devices including a first switching device and a second switching device coupled to each other in electrical series. Each APLM of the plurality of APLMs also has at least one second-type ESD coupled in electrical parallel with both of the first switching device and the second switching device. The at least one second-type ESD is configured to induce a second DC voltage.

In yet another aspect, a method of operating a modular power converter system is provided. The modular power converter system includes at least one first-type ESD configured to induce a first DC voltage, a plurality of APLMs coupled to the at least one first-type ESD, and at least one electrical load device coupled to the plurality of APLMs and coupled to the at least one first-type ESD. The method includes determining an average DC operating voltage of the at least one electrical load device, an average electrical power rating of the at least one electrical load device, and at least one additional electrical power rating greater than the average electrical power rating of the at least one electrical load device. The method also includes maintaining at least one second-type ESD coupled to each APLM of the plurality of APLMs at a second DC voltage. The method further includes supplying the at least one electrical load device with a first DC current at the first DC voltage substantially equal to the average DC voltage, where the first DC current provides a first amount of electrical power to the at least one electrical load device substantially equal to the average electrical power rating. The method also includes discharging, with a plurality of switching devices coupled to each APLM of the plurality of APLMs, the at least one second-type ESD to supply the at least one electrical load device with a second DC current at a voltage substantially equal to the first DC voltage, where the second DC current and the first DC current, when added together, provide a second amount of electrical power to the at least one electrical load device substantially equal to the at least one additional electrical power rating.

DRAWINGS

These and other features, aspects, and advantages of the present disclosure will become better understood when the following detailed description is read with reference to the accompanying drawings in which like characters represent like parts throughout the drawings, wherein.

Figure 1:
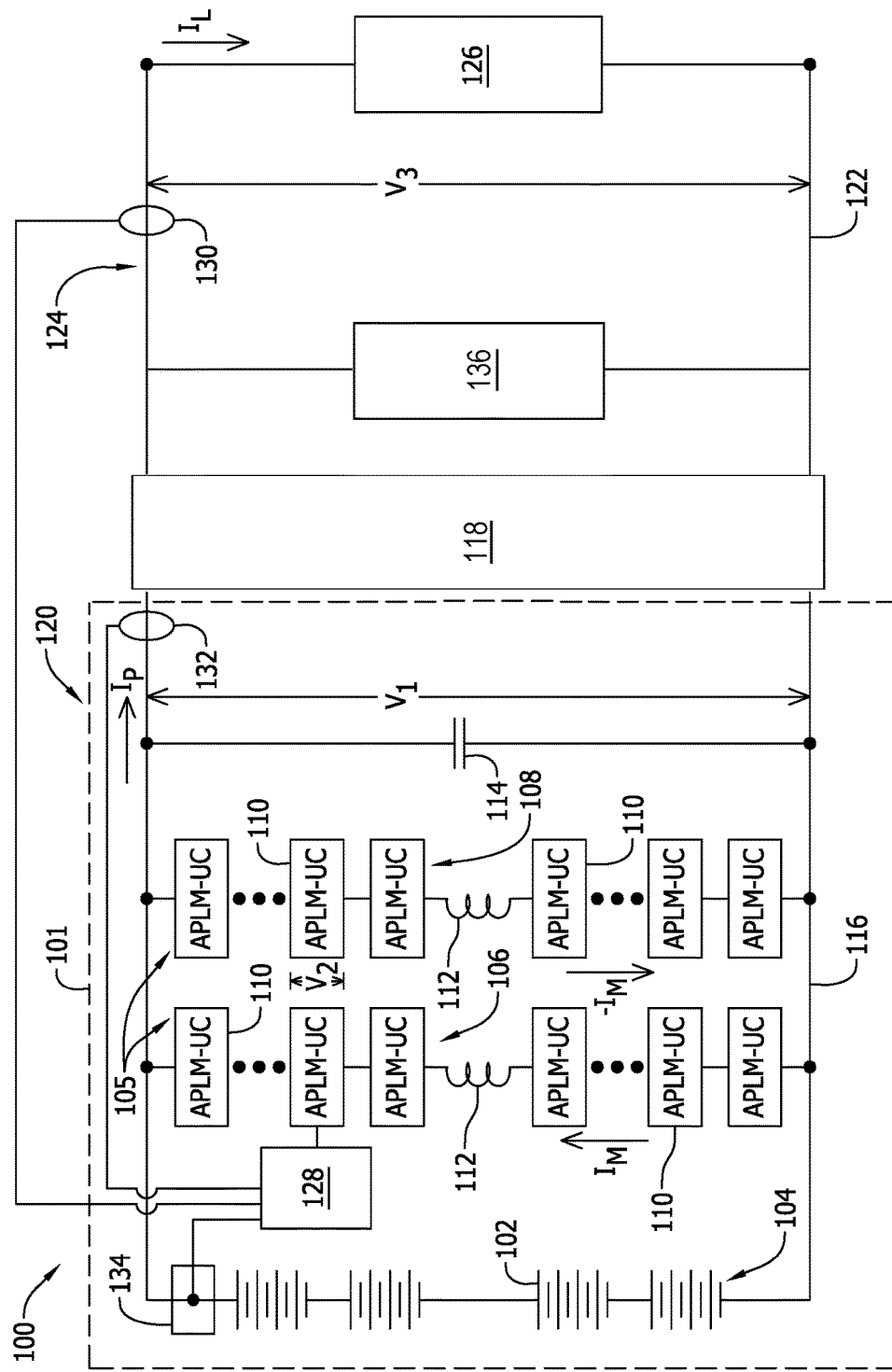
FIG. 1 is a schematic diagram of an exemplary embodiment of a modular power converter system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods for integrating hybrid energy storage devices (ESDs) into DC power systems described herein enable functional integration of modular multi-level converter (MMC)-like power electronics into ESDs such as ultracapacitors for applications in a wide range of DC power system operating voltages. The embodiments described herein also provide a modular, building block-based system which enables scalability and redundancy, and high efficiency and fault tolerant operation in both centralized and distributed power conversion applications. The embodiments described herein further facilitate use of simplified control schemes for energy and power management systems (EMS) based on current and power profiles of supported electrical loads. The systems and methods for integrating hybrid energy storage devices (ESDs) into DC power systems described herein also provide a high efficiency power converter having improved specific power density, less design and development time and expense, and reduced non-recurring engineering (NRE) and other operating costs relative to known systems.

FIG. 1 is a schematic diagram of an exemplary embodiment of a modular power converter system 100. In the exemplary embodiment, modular power converter system includes a modular power conversion device 101. Modular power conversion device 101 includes at least one first-type ESD 102. Modular power conversion device 101 also includes a plurality of first-type ESDs 102 coupled to each other in electrical series as a first-type ESD string 104. In other embodiments, not shown, a plurality of first-type ESDs 102 are coupled to each other in electrical parallel including, without limitation, as a plurality of first-type ESD strings 104. First-type ESD 102 induces a first direct current (DC) voltage, i.e., $V_1$.

Modular power conversion device 101 also includes at least one active power link module (APLM) string 105. In the exemplary embodiment, APLM string 105 is embodied in a plurality of APLM strings 105 including a first APLM string 106 and a second APLM string 108 coupled in electrical parallel to both of first APLM string 106 and first-type ESD string 104. Each APLM string 105 of the plurality of APLM strings 105 includes a plurality of APLMs 110 coupled to each other in electrical series. At least one inductor 112 is coupled in electrical series to and between at least two APLMs 110 of the plurality of APLMs 110, with an equal number of APLMs 110 coupled to each of two terminals of inductor 112. First-type ESD string 104, APLM string 105, and at least one filter capacitor 114 are coupled in electrical parallel to a first DC bus 116. As such, in the exemplary embodiment, first DC bus 116 and first-type ESD string 104, APLM string 105, and filter capacitor 114 are maintained at a voltage potential that is substantially equal to $V_1$.

Also, in the exemplary embodiment, APLM 110 includes at least one second-type ESD, not shown, configured to induce a second DC voltage, i.e., $V_2$. First-type ESD 102 is embodied in a battery. In other embodiments, not shown, first-type ESD 102 is embodied in at least one of an ultracapacitor, a film capacitor, an electrolytic capacitor, a fuel cell, and a rotating energy storage device (e.g., a flywheel). Furthermore, in the exemplary embodiment, modular power converter system 100 includes a high-frequency (HF) DC-to-DC converter 118 coupled in electrical parallel to first DC bus 116 at a first side 120 of HF DC-to-DC converter 118. A second DC bus 122 is also coupled to HF DC-to-DC converter 118 at a second side 124 thereof opposite first side 120. HF DC-to-DC converter 118 is configured to inductively couple and galvanically isolate first DC bus 116 and second DC bus 122. HF DC-to-DC converter 118 is further configured to convert $V_1$ to a third DC voltage, i.e., $V_3$. Thus, second DC bus 122 is maintained at a voltage potential substantially equal to $V_3$. Moreover, at least one electrical load device 126 is coupled in electrical parallel to second DC bus 122. In other embodiments, not shown, a plurality of electrical load devices 126 are coupled in electrical series to second DC bus 122. In still other embodiments, not shown, a plurality of electrical load devices 126 are coupled in electrical parallel to second DC bus. In yet other embodiments, not shown, modular power converter system 100 does not include HF DC-to-DC converter 118 and second DC bus 122. In those other embodiments which do not include HF DC-to-DC converter 118, electrical load device 126 is coupled in electrical parallel and further galvanically coupled to modular power conversion device 101 through first DC bus 116 only, and therefore, APLM string 105, first-type ESD string 104, and electrical load devices are each maintained at a voltage potential substantially equal to $V_1$.

Modular power converter system 100 further includes a plurality of sensors coupled to a switching controller 128 that is further coupled to each APLM 110 of the at least two APLMs 110. A first sensor 130 is coupled to second DC bus 122 and is configured to detect and measure a load current, i.e., $I_L$, through electrical load device 126 on second side 124. A second sensor 132 is coupled to first DC bus and is configured to detect and measure a first side current, i.e., $I_P$, transmitted to HF DC-to-DC converter 118 from first side 120. A third sensor 134 is coupled to first-type ESD 102 and is configured to detect and measure a first-type ESD voltage, i.e., $V_1$. As further shown and described below with reference to FIGS. 3 and 5, switching controller 128 is configured to control the switching states (e.g., frequency and duty cycle of switching) of a plurality of switching devices in each APLM 110 of the at least two APLMs 110 and in HF DC-to-DC converter 118. Also, each APLM 110 of the at least two APLMs 110 is detachably and electrically coupled to modular power converter system 100 such that, in the event of malfunction, a non-functional APLM 110 is removable and replaceable from APLM string 105 and modular power converter system 100.

Modular power converter system 100 also includes at least one power source 136 coupled in electrical parallel to second DC bus 122. Power source 136 is configured to induce a DC voltage including, without limitation, a DC voltage substantially equal to $V_3$, to supply electrical load device 126 with electric power required for operation. For example, and without limitation, including power source 136 on second DC bus 122 facilitates continued operation of electrical load device 126 at $V_3$ in cases such as removal of modular power conversion device 101 from modular power converter system 100 for at least one of maintenance, reconfiguration, and replacement.

Figure 2:
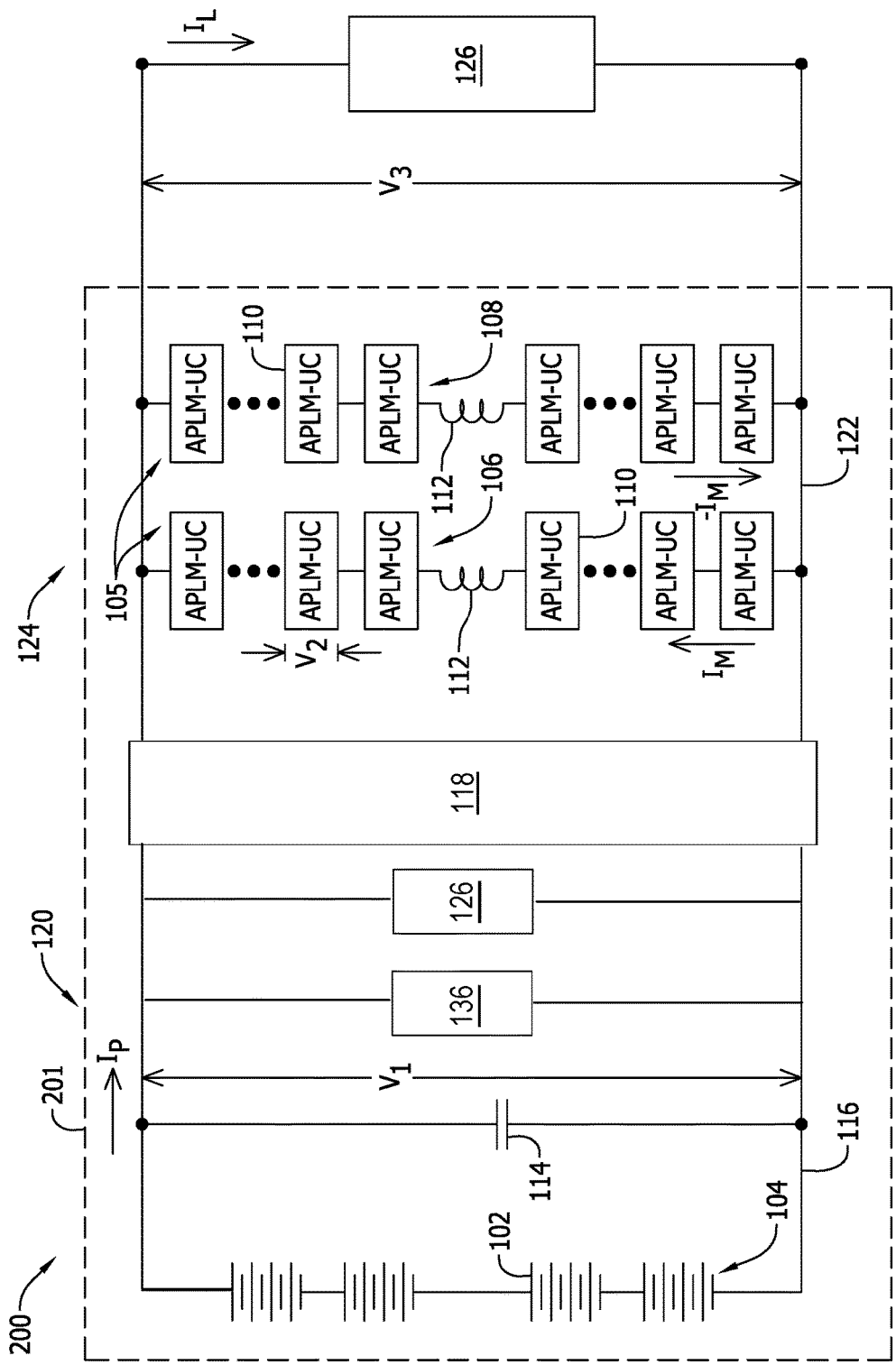
FIG. 2 is a schematic diagram of an alternative embodiment of a modular power converter system.

FIG. 2 is a schematic diagram of an alternative embodiment of a modular power converter system 200. In the alternative embodiment, a modular power conversion device 201 includes plurality of APLM strings 105 coupled in electrical parallel to second DC bus 122, rather than to first DC bus 116. Modular power conversion device 201 also includes HF DC-to-DC converter 118. In other embodiments, not shown, at least one APLM string 105 is coupled in electrical parallel to both of first DC bus 116 and second DC bus 122. Also, in the alternative embodiment, both of the plurality of APLM strings 105 and the at least one electrical load device 126 are maintained at $V_3$ on second side 124 of HF DC-to-DC converter 118, while the at least one first-type ESD 102 is maintained at $V_1$ on first side 120 of HF DC-to-DC converter 118. Thus, in the alternative embodiment, the plurality of APLM strings 105 are galvanically isolated and inductively coupled to first-type ESD 102.

In other embodiments, not shown, at least one electrical load device 126 is coupled in electrical parallel to first DC bus 116 in addition to being coupled in electrical parallel to second DC bus 122. At least one additional electrical load device 126 coupled to first DC bus 116 is thus configured to operate at a DC voltage potential substantially equal to $V_1$. In those embodiments which further include at least one APLM string 105 coupled in electrical parallel to first DC bus 116, APLM string 105 on first side 120 is maintained at $V_1$, and APLM string 105 on second side 124 is maintained at $V_3$. In still other embodiments, not shown, at least one first-type ESD string 104 is coupled in electrical parallel to second side 124 instead of, or in addition to, being coupled to first side 120. Modular power converter system 200 also includes at least one power source 136 coupled in electrical parallel to first DC bus 116, and is configured to induce a DC voltage including, without limitation, a DC voltage substantially equal to $V_1$, to supply at least one additional electrical load device 126 coupled to first DC bus 116 with electric power required for operation. For example, and without limitation, including power source 136 on first DC bus 116 facilitates continued operation of electrical load device 126 at $V_1$ in cases such as removal of first-type ESD string 104 from modular power converter system 200 for at least one of maintenance, reconfiguration, and replacement.

In the exemplary embodiment, modular power converter system 200, and similarly modular power converter system 100, a primary source of electrical power is embodied in first-type ESD string 104. Those skill in the art will appreciate that at least one power source 136 other than, or in addition to, first-type ESD string 104 is readily integrated into modular power converter systems 100 and 200. For example, and without limitation, modular power converter systems 100 and 200 can include an alternating current-to-DC power converter which converts AC electrical power to a DC voltage on at least one of first DC bus 116 and second DC bus 122 from at least one of an alternating current (AC) generator and an AC utility grid. Similarly, power source 136 can include renewable electric power resources such as a photovoltaic system coupled to at least one of first DC bus 116 and second DC bus 122. In either of these examples, first-type ESD string 104 can be charged and maintained at a voltage potential of at least one of $V_1$ and $V_3$ through various type of power sources 136, and modular power converter systems 100 and 200 can utilize first-type ESD string 104 as a primary source of power, and employ such other aforementioned power sources 136 as a back-up power source. Likewise, first-type ESD string 104 can be maintained at a voltage potential of at least one of $V_1$ and $V_3$, but modular power converter systems 100 and 200 can employ at least one power source 136 for primary power, and use first-type ESD string 104 as a backup source.

Figure 3:
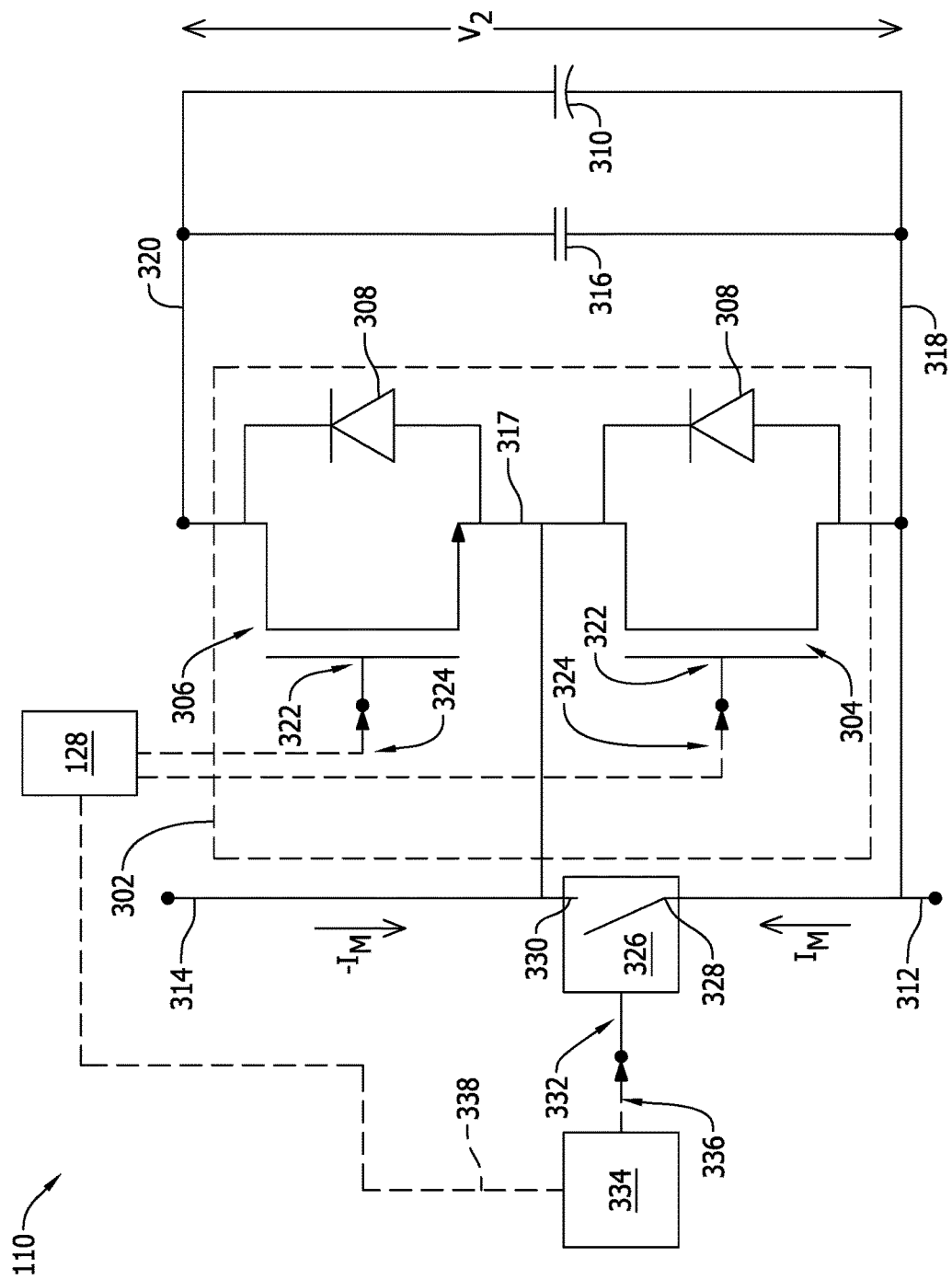
FIG. 3 is a schematic diagram of an exemplary embodiment of an active power link module (APLM) that may be used in the modular power converter systems shown in FIGS. 1 and 2.

FIG. 3 is a schematic diagram of an exemplary embodiment of an APLM 110 that may be used in modular power converter system 100 and modular power converter system 200 (shown in FIGS. 1 and 2, respectively). In the exemplary embodiment, APLM 110 includes a plurality of switching devices 302. The plurality of switching devices 302 includes a first switching device 304 and a second switching device 306 coupled in electrical series with first switching device 304. Each switching device 302 of the plurality of switching devices 302 includes an antiparallel diode 308 coupled in electrical parallel thereto. APLM 110 includes at least one second-type ESD 310 coupled in electrical parallel with both of first switching device 304 and second switching device 306. Second-type ESD 310 induces second DC voltage, i.e., $V_2$, across a first APLM terminal 312 and a second APLM terminal 314 of APLM 110. A capacitor 316 is coupled in electrical parallel with both of first switching device 304 and second switching device 306. Moreover, second-type ESD 310 is embodied in an ultracapacitor. In other embodiments, not shown, second-type ESD 310 is embodied in at least one of a battery, a film capacitor, an electrolytic capacitor, a rotating energy storage device, and a fuel cell. Furthermore, in the exemplary embodiment, second-type ESD 310 is a different type of ESD (e.g., ultracapacitor) than first-type ESD 102 (e.g., battery). In other embodiments, not shown, first-type ESD 102 is the same type of ESD as second-type ESD 310.

Also, in the exemplary embodiment, first switching device 304 is coupled in electrical series to second switching device 306 at a first node 317. First node 317 includes second APLM terminal 314. First switching device 304 is further coupled to a second node 318 opposite first node 317 and second switching device 306 is further coupled to a third node 320 opposite first node 317. Similarly, second-type ESD 310 and capacitor 316 are coupled to second node 318 and third node 320. Further, each switching device 302 of the plurality of switching devices 302 is embodied in an insulated-gate bipolar transistor (IGBT). In other embodiments, not shown, each switching device 302 of the plurality of switching devices 302 is embodied in at least one of an integrated gate commutated thyristor, a non-linear controllable resistor, a varistor, and a transistor other than IGBT-type including, without limitation, a metal-oxide semiconductor field-effect transistor (MOSFET), an injection enhanced gate transistor, a junction gate field-effect transistor (JFET), a bipolar junction transistor (BJT), and combinations thereof. These devices can be made of at least one of silicon (Si) and wide bandgap materials such as silicon carbide (SiC) or gallium nitride (GaN).

Further, in the exemplary embodiment, each switching device 302 of the plurality of switching devices 302 includes a switch terminal 322 coupled to switching controller 128. Switching controller 128 is configured to transmit at least one switch control signal 324 to first switching device 304 and second switching device 306 to control their switching states including, without limitation, a frequency and a duty cycle of their switching. Switching controller 128 is further configured to transmit at least one switch control signal 324 to alternately open and close at least one switching device 302 of the plurality of switching devices 302. Thus, switching controller 128 enables modular power converter system 100 and modular power converter system 200 to establish a plurality of switching states of the plurality of switching devices 302 in APLM 110. In other embodiments, not shown, switching controller 128 receives and transmits other control signals to and from other controllers located elsewhere within or outside at least one of APLM 110 and modular power converter systems 100 and 200.

Furthermore, in the exemplary embodiment, at least one bypass switch 326 including, without limitation, such devices as non-linear controllable resistors, varistors, and transistors such as IGBTs, MOSFETs, JFETs, BJTs, and relays, is coupled to APLM 110. Bypass switch 326 is coupled in electrical parallel with at least one switching device 302 of the plurality of switching devices 302 of APLM 110. Bypass switch 326 includes a first bypass terminal 328 coupled to second node 318 and a second bypass terminal 330 coupled to third node 320. Bypass switch 326 also includes a bypass control terminal 332 coupled to at least one bypass controller 334. Bypass controller 334 is configured to transmit a bypass control signal 336 to bypass control terminal 332 to close bypass switch 326 when at least one APLM state, including, without limitation, a physical state such as voltage, current, charge, and temperature associated with second-type ESD 310, is present. Likewise, bypass controller 334 is configured to transmit bypass control signal 336 to bypass control terminal 332 to open bypass switch 326 when at least one APLM state is not present. When bypass switch 326 is open, an APLM string 105 current, i.e., $I_M$ (also shown above with reference to FIGS. 1 and 2), flows through APLM 110 to second-type ESD 310 and the plurality of switching devices 302. When bypass switch 326 is closed, on the other hand, $I_M$ does not flow to second-type ESD 310 and the plurality of switching devices 302, i.e., $I_M$ is bypassed around APLM 110. Bypass controller 334 is at least one of electrically and communicatively coupled to switching controller 128.

In operation, in the exemplary embodiment, the plurality of switching devices 302 provide MMC-like power electronics integrated into each APLM 110 with second-type ESD 310. The flow of $I_M$ and the direction in which $I_M$ flows, i.e., $I_M$ versus $-I_M$, in APLM string 105 is controlled via the timing of switching states of the plurality of switching devices 302, as implemented by switching controller 128. As such, in operation of the exemplary embodiment, switching controller 128 facilitates maintaining a desired charging or discharging state of second-type ESD 310, and thereby the proportion of electrical power supplied to at least one of first DC bus 116 and second DC bus 122 by at least one APLM string 105. For example, and without limitation, first switching device 304 on and second switching device 306 off enables current flow in the $-I_M$ direction and facilitates charging of second-type ESD 310. First switching device 304 off and second switching device 306 on enables current flow in the $+I_M$ direction, i.e., opposite the $-I_M$ direction, and facilitates discharging of second-type ESD 310 to support increased power requirements of electrical load device 126. To provide an average power, i.e., $P_{avg}$, requirement of electrical load device 126, switching controller 128 alternately opens and closes both of first switching device 304 and second switching device 306 at a predetermined frequency and duty cycle to maintain an efficient power and energy balance between first-type ESD 102, not shown, and second-type ESD 310, as further shown and described below with reference to FIGS. 6-10.

Also, in operation of the exemplary embodiment, bypass controller 334 is configured to transmit bypass control signal 336 to close bypass switch 326 when the at least one APLM state has a first predetermined value, and open bypass switch 326 when the at least one APLM state has a second predetermined value different from the first predetermined value. At least one of bypass controller 334 and switching controller 128 is further configured to determine an operational status including a functional status and a non-functional status of at least one APLM 110 of the plurality of APLMs 110 in modular power conversion device 101. For example, and without limitation, a physical state of APLM 110 such as an elevation of temperature of second-type ESD 310 above a predetermined threshold temperature is indicative of a non-functional status of APLM 110, whereas a temperature of second-type ESD 310 within a predetermined range of temperatures is indicative of a functional status of APLM 110. Similarly, an operating voltage of second-type ESD 310 outside a predetermined tolerance of $V_2$ is indicative of a non-functional status of APLM 110, whereas the operating voltage of second-type ESD 310 within a predetermined tolerance of $V_2$ is indicative of a functional status of APLM 110.

At least one of switching controller 128 and bypass controller 334 is, therefore, further configured to transmit a status signal 338, received at bypass controller 334, that is representative of the operational status of APLM 110. Bypass controller 334 thus transmits bypass control signal 336 to bypass switch 326 based on the operational status, and is further configured to alternately electrically couple (i.e., when bypass switch 326 is open) and electrically isolate (i.e., when bypass switch 326 is closed) at least one APLM 110 of APLM string(s) 105 from modular power converter system 100 and modular power converter system 200. As such, in operation of modular power converter system 100 and 200, APLM string 105 current (i.e., at least one of $I_M$ and $-I_M$) is permitted to flow through APLM(s) 110 having the functional status, and APLM string 105 current is not permitted to flow through APLM(s) 110 having the non-functional status, thereby providing inherent redundancy and continuity of operation in modular power converter systems 100 and 200 in the event of malfunction of at least one APLM 110, including, without limitation, a malfunction of at least one of second-type ESD 310 and at least one switching device 302 of the plurality of switching devices 302.

Further, in operation, in the exemplary embodiment, with the plurality of APLMs 110 in APLM string 105, switching of the plurality of switching devices 302 is interleaved. For example, and without limitation, the MMC-like power electronics structure in each APLM 110 of the plurality of APLMs 110 in DC power systems applications results in a high equivalent switching frequency with relatively low switching frequency for each APLM 110 building block. For an APLM string 105 containing twelve APLMs 110 coupled in electrical series, for example, if the switching frequency of each APLM 110 is 4 kilohertz (kHz), the interleaved APLM string 105 will have an equivalent switching frequency of 12*4 kHz, i.e., 48 kHz. This high equivalent switching frequency enables a fast dynamic response with high power quality needed for many applications of modular power converter systems 100 and 200.

Figure 4:
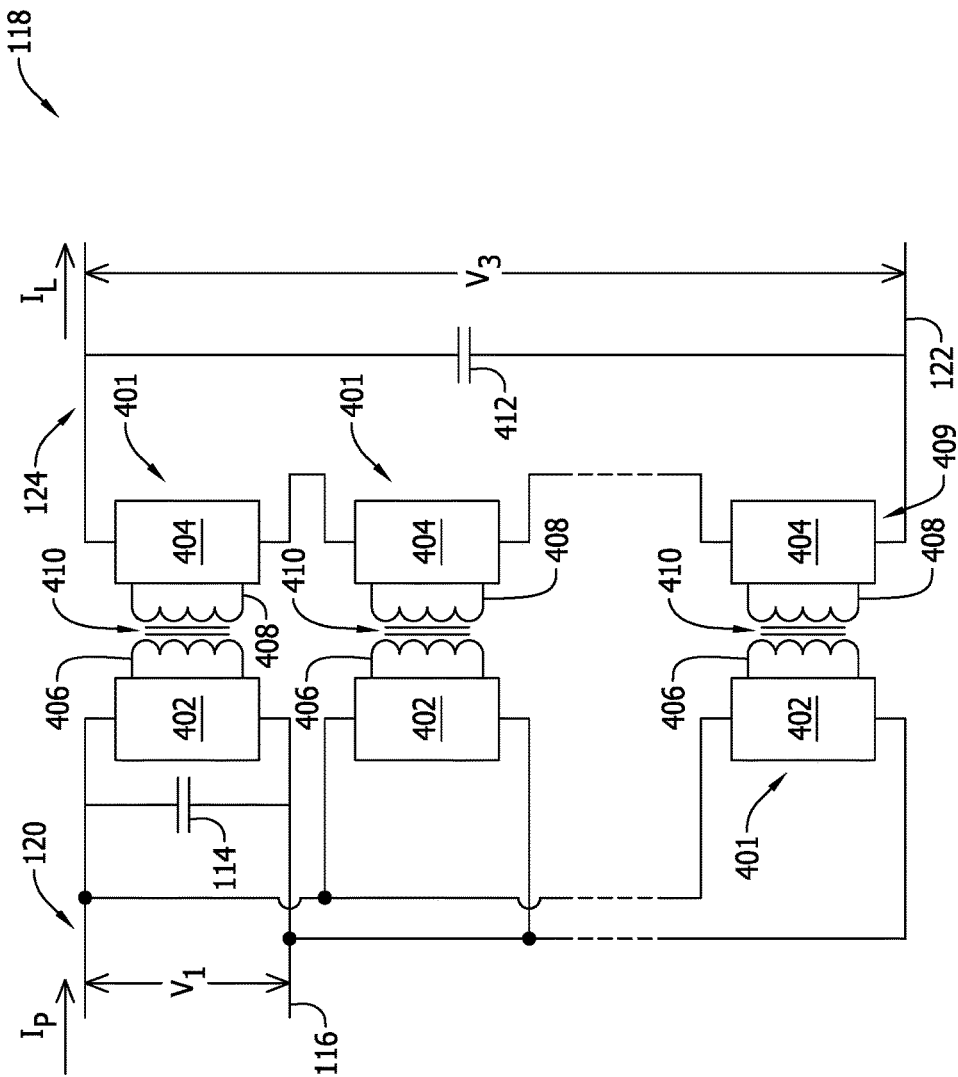
FIG. 4 is a schematic diagram of an exemplary high frequency (HF) direct current (DC)-to-DC converter that may be used with the modular power converter systems shown in FIGS. 1 and 2.

FIG. 4 is a schematic diagram of an exemplary HF DC-to-DC converter 118 that may be used with the modular power converter system 100 and the modular power converter system 200 (shown in FIGS. 1 and 2, respectively). In the exemplary embodiment, first DC bus 116 and second DC bus 122 are coupled to first side 120 and second side 124, respectively, of HF DC-to-DC converter 118. HF DC-to-DC converter 118 includes at least one converter pair 401. Converter pair 401 is embodied in a plurality of converter pairs 401. Each converter pair 401 of the plurality of converter pairs 401 includes a DC-to-alternating current (AC) converter 402 coupled to first DC bus 116 and an AC-to-DC converter 404 coupled to second DC bus 122. Each converter pair 401 also includes a primary winding 406 coupled to DC-to-AC converter 402 and a secondary winding 408 coupled to AC-to-DC converter 404. Primary winding 406 is defined by a first number of turns about a core 410, and secondary winding 408 is defined by a second number of turns about core 410, where the second number of turns is different from the first number of turns. In other embodiments, not shown, the first number of turns is equal to the second number of turns. In still other embodiments, not shown, converter pair 401 does not include core 410.

Also, in the exemplary embodiment, primary winding 406 and secondary winding 408 are galvanically isolated from each other and are also inductively coupled to each other. Each DC-to-AC converter 402 of the plurality of converter pairs 401 is separately coupled in electrical parallel with first DC bus 116. Each AC-to-DC converter 404 of the plurality of converter pairs 401 is coupled to each other in electrical series as a string 409 of a plurality of AC-to-DC converters 404, and string 409 is further coupled in electrical parallel with second DC bus 122.

In operation, in the exemplary embodiment, HF DC-to-DC converter 118 is configured to step-up $V_1$ to $V_3$ (i.e., $V_3 > V_1$) through a transformer action of each converter pair 401 of the plurality of converter pairs 401. A step-up ratio, i.e., $V3 \div V1$, is determined by at least one of a ratio of first number of turns of primary winding 406 relative to second number of turns of secondary winding 408, and a switching frequency and duty cycle of a plurality of switching devices, not shown, in each of DC-to-AC converter 402 and AC-to-DC converter 404 (as shown and described below with reference to FIG. 5). In other embodiments, not shown, HF DC-to-DC converter 118 is configured to at least one of step-down $V_1$ to $V_3$ (i.e., $V_1 > V_3$) and maintain $V_1$ substantially equal to $V_3$. Where $V_3 > V_1$, $I_P$ flowing into DC-to-AC converter 402 on first DC bus 116 is greater than $I_L$ flowing out of AC-to-DC converter 404 on second DC bus 122, and an electrical power input on first side 120 is substantially equal to an electrical power output of second side 124. HF DC-to-DC converter 118 also facilitates isolation of electrical faults and malfunctions present on first side 120 and second side 124 from the above described components of modular power converter systems 100 and 200 on second side 124 and first side 120, respectively.

Also, in operation, HF DC-to-DC converter 118 utilizes converter pair 401 as a modular building block to facilitate replacing at least one malfunctioning converter pair 401 without replacing an entire HF DC-to-DC converter 118 subsystem. Modularity of converter pair 401 further enables customizing HF DC-to-DC converter 118 to fit the needs of a particular electrical power system application. Further, in operation, modular building blocks of converter pairs 401 enables HF DC-to-DC converter 118 to provide the fast response needed to meet transient response requirements for medium voltage loads on second side 124 of modular power converter systems 100 and 200. Further, in the case of medium to high voltage loads on the second side 124, and where, for example and without limitation, second-type ESD 310 is embodied in an ultracapacitor, the power rating and switching frequency requirements of HF DC-to-DC converter 118 are reduced and relaxed, but the voltage insulation required for the APLM 110 is upgraded to a higher medium voltage level, along with extra attention given to fault protection schemes. Thus, in modular power converter systems 100 and 200, HF DC-to-DC converter 118 functions as a high frequency isolation transformer between first side 120 and second side 124.

Figure 5:
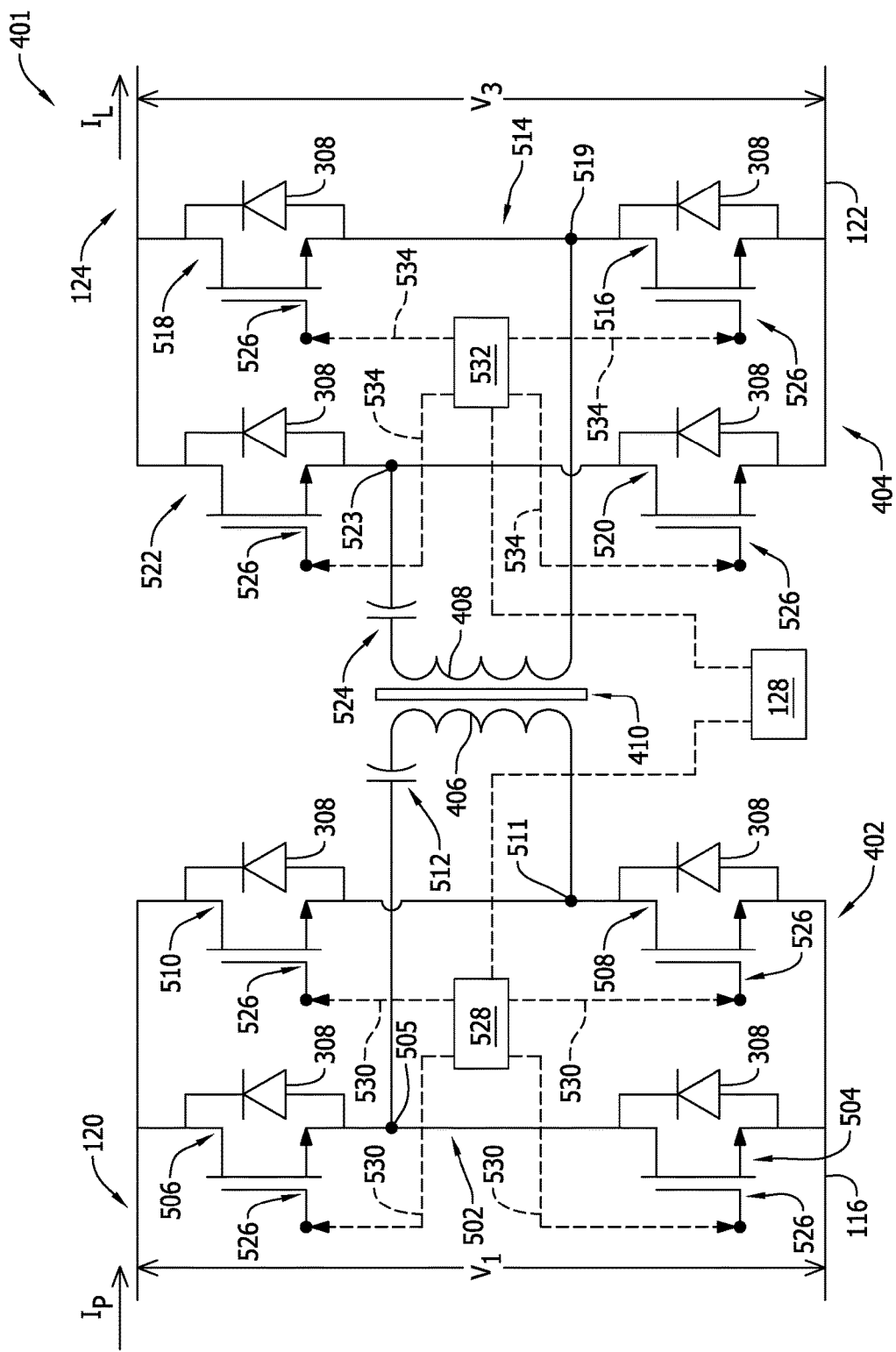
FIG. 5 is an exemplary embodiment of a converter pair that may be used with the HF DC-to-DC converter shown in FIG. 4.

FIG. 5 is an exemplary embodiment of a converter pair 401 that may be used with HF DC-to-DC converter 118 (shown in FIG. 4). In the exemplary embodiment, DC-to-AC converter 402 includes a first plurality of switching devices 502. First plurality of switching devices 502 is embodied in a first converter switching device 504 coupled in electrical series with a second converter switching device 506 at a first node 505, and a third converter switching device 508 coupled in electrical series with a fourth converter switching device 510 at a second node 511. Each switching device 502 of first plurality of switching devices 502 includes antiparallel diode 308 coupled in electrical parallel thereto. A first pair of switching devices 502 including first converter switching device 504 and second converter switching device 506 is coupled in electrical parallel to first DC bus 116. A second pair of switching devices 502 including third converter switching device 508 and fourth converter switching device 510 is also coupled in electrical parallel to first DC bus 116. Thus, first and second pairs of switching devices 502 form a full-bridge DC-to-AC power converter. Primary winding 406 is coupled to and between first node 505 and second node 511, and includes at least one first capacitor 512 coupled in electrical series therewith. In other embodiments, not shown, primary winding 406 does not include first capacitor 512.

Also, in the exemplary embodiment, AC-to-DC converter 404 includes a second plurality of switching devices 514. Second plurality of switching devices 514 is embodied in a fifth converter switching device 516 coupled in electrical series with a sixth converter switching device 518 at a third node 519, and a seventh converter switching device 520 coupled in electrical series with an eighth converter switching device 522 at a fourth node 523. Each switching device 514 of second plurality of switching devices 514 includes antiparallel diode 308 coupled in electrical parallel thereto. A third pair of switching devices 514 including fifth converter switching device 516 and sixth converter switching device 518 is coupled in electrical parallel to second DC bus 122. A fourth pair of switching devices 514 including seventh converter switching device 520 and eighth converter switching device 522 is also coupled in electrical parallel to second DC bus 122. Thus, third and fourth pairs of switching devices 514 form a full-bridge DC-to-AC power converter. Secondary winding 408 is coupled to and between third node 519 and fourth node 523 and includes at least one second capacitor 524 coupled in electrical series therewith. In other embodiments, not shown, secondary winding 408 does not include second capacitor 524.

Further, in the exemplary embodiment, each switching device 502 of first plurality of switching devices 502 includes a converter switch terminal 526 which is at least one of electrically coupled and communicatively coupled to a first converter controller 528. First converter controller 528 is configured to transmit at least one first converter control signal 530 to first plurality of switching devices 502 to control their switching states including, without limitation, a frequency and a duty cycle of their switching. First converter controller 528 is further configured to transmit at least one first converter control signal 530 to alternately open and close at least one switching device 502 of first plurality of switching devices 502. Thus, first converter controller 528 enables modular power converter systems 100 and 200 to establish a plurality of switching states of each switching device 502 of first plurality of switching devices 502 in DC-to-AC converter 402. First converter controller 528 is further coupled to switching controller 128.

Furthermore, in the exemplary embodiment, each switching device 514 of second plurality of switching devices 514 includes converter switch terminal 526 which is at least one of electrically coupled and communicatively coupled to a second converter controller 532. Second converter controller 532 is configured to transmit at least one second converter control signal 534 to second plurality of switching devices 514 to control their switching states including, without limitation, a frequency and a duty cycle of their switching. Second converter controller 532 is further configured to transmit at least one second converter control signal 534 to alternately open and close at least one switching device 514 of second plurality of switching devices 514. Thus, second converter controller 532 enables modular power converter systems 100 and 200 to establish a plurality of switching states of each switching device 514 of first plurality of switching devices 514 in AC-to-DC converter 404. Second converter controller 532 is further coupled to switching controller 128. In other embodiments, not shown, converter pair 401 includes a single converter controller coupled to each switching device of both first plurality of switching devices 502 and second plurality of switching devices 514. In still other embodiments, not shown, the functionality of at least one of first converter controller 528 and second converter controller 532 is assumed by switching controller 128 coupled to each switching device of at least one of first plurality of switching devices 502 and second plurality of switching devices 514.

In operation, in the exemplary embodiment, primary winding 406 and second winding 408 inductively couples and galvanically isolates first plurality of switching devices 502 and second plurality of switching devices 514, respectively. First converter controller 528 and second converter controller 532 facilitate a high frequency switching of first plurality of switching devices 502 and second plurality of switching devices 514 to enable power conversion from first DC bus 116 to second DC bus 122 with negligible losses. Also, in operation, at least one of first converter controller 528, second converter controller 532, and switching controller 128 transmits at least one of first 530 and second 534 converter control signals to alternately open and close each switching device of first plurality of switching devices 502 and second plurality of switching devices 514, respectively, to control their switching frequency and duty cycle. In addition to the number of primary winding 406 first number of turns relative to secondary winding 408 second number of turns, control of switching frequency and duty cycle of first plurality of switching devices 502 and second plurality of switching devices 514 dictates power conversion, i.e., $V_3 \div V_1$, of HF DC-to-DC converter 118.

Also, in operation, converter pair 401 of HF DC-to-DC converter 118 is a bi-directional power converter. A user of modular power converter systems 100 and 200 determines at least one of a switching timing, a switching frequency, and a switching duty cycle of first plurality of switching devices 502 and second plurality of switching devices 514 to facilitate desired power conversion parameters of HF DC-to-DC converter 118. Further, in operation, based on the desired power conversion parameters, users of modular power converter systems 100 and 200 configure, e.g., program a control logic of in at least one of the software and firmware of at least one of first converter controller 528, second converter controller 532, and switching controller 128 to facilitate efficient power and energy balance between first-type ESD 102 and second-type ESD 310, and to ensure adequate supply of electrical power to at least one electrical load device. For example, and without limitation, where electrical load device 126 is configured to both consume and supply electrical power, flow of electrical power from first side 120 to second side 124 of HF DC-to-DC converter 118 is reversible to be used on first side 120 to charge at least one of first-type ESD 102 and second-type ESD 310.

Figure 6:
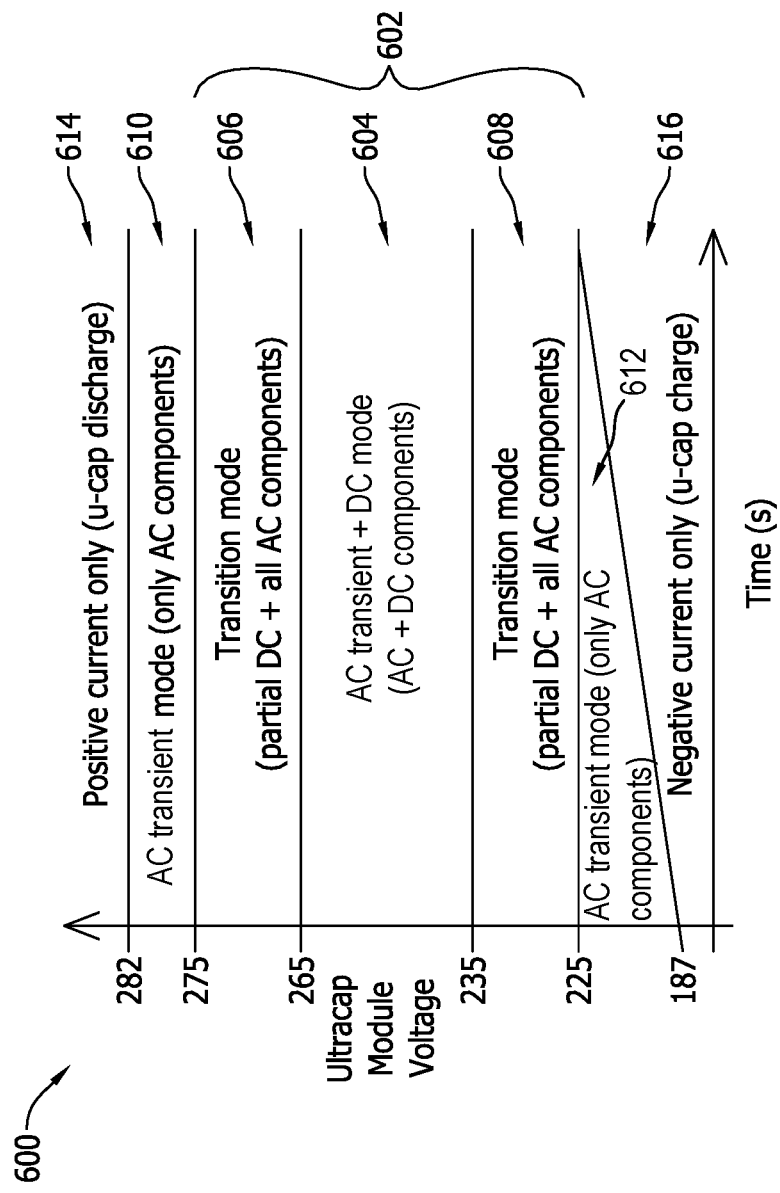
FIG. 6 is a graphical representation of operation of the modular power converter systems shown in FIGS. 1 and 2.

FIG. 6 is a graphical representation, i.e., graph 600, of operation of modular power converter system 100 and modular power converter system 200 (shown in FIGS. 1 and 2, respectively). In the exemplary embodiment, graph 600 depicts a plurality of operating regions of modular power converter systems 100 and 200 based on an operating voltage (y-axis) of second-type ESD 310 in APLM 110 (e.g., ultracapacitor module voltage) over time in seconds (s) (x-axis). At least one of switching controller 128, bypass controller 334, first converter controller 528, and second converter controller 532 are further configured to implement control (i.e., through controlling the plurality of switching states of switching devices in APLM 110 and HF DC-to-DC converter 118), and energy and power management of at least one of first-type ESD 102 and second-type ESD 310. APLM 110 is further embodied in a hybrid ESD (HESD) system that handles multiple time scale loads, supports stochastic pulse loads and transients including, without limitation, AC transients, and enables fuel-efficient generator operation and uninterrupted power supply (UPS) function. In the case of second-type ESD 310 embodied in at least one ultracapacitor, the ultracapacitor handles short duration, i.e., seconds or fractions of seconds, pulse and transient loads, leveraging ultracapacitors' high power density and long cycle life. Where first-type ESD 102 is embodied in at least one battery, however, the battery facilitates longer time duration, i.e., minutes or hours, operation of electrical load device 126 and further supports fuel-efficient generator operation and UPS function.

Thus, in the exemplary embodiment, controls, and energy and power management of the HESD APLM 110 in the wider context of modular power converter systems 100 and 200 includes an EMS implemented, at least in part, by at least one of switching controller 128, bypass controller 334, first converter controller 528, and second converter controller 532 (as shown and described above with reference to FIGS. 1-5). EMS is embodied in at least one control algorithm based, at least in part, on at least one of filters, rules, and lookup tables. For example, and without limitation, where modular power converter system 100 is a DC power system with $V_1$=1 kV, i.e., a low voltage first side 120, and with 1 kV<$V_3$≤20 kV, i.e., a medium voltage second side 124, electrical load device 126 requires an average power, i.e., $P_{avg}$=$V_3$*$I_L$. Thus, for electrical load device 126, users of modular power converter system 100 determine $P_{avg}$ and an average value of $V_3$ for operation, and electrical load device 126 is selected to have an average electrical power rating, i.e., $P_{avg}$=$V_3$*$I_L$. Further, in operation, at least one additional electrical power rating, e.g., a peak power rating $P_{peak}$, is determined by users of modular power converter system 100 for electrical load device 126. The at least one additional electrical power rating is greater than $P_{avg}$ and represents an upper limit on electrical power that electrical load device 126 can be expected to experience (e.g., during load transients) during operation of the exemplary embodiment.

Operation of modular power converter systems 100 and 200 includes a plurality of operating regions which depend upon operating conditions of electrical load device 126. Operating conditions of electrical load device 126 are determined by at least one sensor (as shown and described above with reference to FIG. 1). Based upon sensed parameters of at least one of electrical load device 126, first-type ESD 102, and second-type ESD 310, controllers in modular power converter systems 100 and 200 including, without limitation, switching controller 128, first converter controller 528, and second converter controller 532 establish a plurality of switching states in APLM 110 and HF DC-to-DC converter 118. The plurality of switching states enable alternate discharging and charging of second-type ESD 310, and also adjust the operating voltage, i.e., $V_2$, of second-type ESD 310 to be a value that is within a plurality of predetermined ranges, as described below.

Where electrical load device 126 operates under conditions requiring $P_{avg}$, modular power converter systems 100 and 200 operate in a first operating region 602 including an average power subregion 604. In average power subregion 604, switching controller 128 and the plurality of switching devices 302 of APLM 110 maintain second-type ESD 310 embodied in at least one ultracapacitor at 235 V≤$V_2$≤265 V. Average power subregion 604 includes brief (e.g., at least one of seconds and fractions of a second in duration) positive and negative transients that do not require substantial deviations from $P_{avg}$ to support electrical load device 126. Also, in average power subregion 604, $I_L$ consists primarily of DC components and only partially of AC components. Further, in the exemplary embodiment, with electrical load device 126 operating in average power subregion 604, $P_{avg}$ is primarily supplied by first-type ESD 102 (e.g., at least one battery), and second-type ESD 310 in APLM 110 is discharged to supply transient power only where such requirements last for sustained periods of time (e.g., multiple seconds in length).

Also, in the exemplary embodiment, first operating region 602 also includes a first positive transient subregion 606 and a first negative transient subregion 608, i.e., a first and a second transition mode, respectively. First positive transient subregion 606 represents periods of time during which electrical load device 126 experiences primarily AC transient components and $I_L$ consists only partially of DC components. AC transient components during first positive transient subregion 606 are positive load transients requiring electrical load device 126 to draw electrical power of up to $P_{peak}$ through discharge of second-type ESD 310, i.e., $I_P$=$I_M$+an average current, $I_{avg}$, supplied by battery, such that $P_{peak}$=$P_{avg}$+additional power supplied from at least one second-type ESD 310. In first positive transient subregion 606, switching controller 128 and the plurality of switching devices 302 of APLM 110 maintain second-type ESD 310 at 225 V≤$V_2$≤235 V.

Further, in the exemplary embodiment, first negative transient subregion 608 also represents periods of time during which electrical load device 126 experiences primarily AC transient components and $I_L$ consists only partially of DC components. AC transient components during first negative transient subregion 608 are negative load transients requiring electrical load device 126 to draw an amount of electrical power of less than $P_{avg}$ by as much as $P_{peak}$-$P_{avg}$. Thus, in first negative transient subregion 608, $I_P$ needed to be supplied from first side 120 for meeting electrical load device 126 power requirements decreases by an amount substantially equal to $I_M$. In first negative transient subregion 608, switching controller 128 and the plurality of switching devices 302 of APLM 110 maintain second-type ESD 310 at 265 V<$V_2$≤275 V. Therefore, APLM string 105 current flows in the $-I_M$ direction including, without limitation, to be used by at least one APLM 110 to charge at least one second-type ESD 310.

Furthermore, in the exemplary embodiment, the plurality of operating regions depicted in graph 600 includes a first AC transient mode region 610 and a second AC transient mode region 612. In both of first AC transient mode region 610 and second AC transient mode region 612, electrical load device 126 experiences only AC transient components and power required by electrical load device 126 is supplied by both first-type ESD 102 and second-type ESD 310. In first AC transient mode region 610, electrical power required by electrical load device 126 exceeds the amount of power required during first operating region 602, and $I_M$ flows from at least one APLM string 105 coupled to at least one of first side 120 and second side 124 from at least one second-type ESD 310 maintained at 275 V<$V_2$≤282 V. In second AC transient mode region 612, electrical power is supplied, at least in part, by electrical load device 126 and is thus available to charge second-type ESD 310 that is maintained at 187 V≤$V_2$<225 V with APLM string 105 experiencing a net flow of APLM string 105 current in the $-I_M$ direction.

Moreover, in the exemplary embodiment, the plurality of operating regions depicted in graph 600 includes a positive current only region 614 and a negative current only region 616. In positive current only region 614, electrical power required by electrical load device 126 is supplied exclusively by second-type ESD 310 through discharging thereof. Also, in positive current only region 614, second-type ESD 310 is maintained at $V_2$>282 V. In negative current only region 616, electrical load device 126 no longer draws electrical power from first-type ESD 102 and second-type ESD 310, but rather at least one of electrical load device 126 and power source 136 supplies electrical power to second-type ESD 310 where it is used to charge second-type ESD 310. Also, in negative current only region 616, second-type ESD 310 is maintained at $V_2$<225 V. Thus, the plurality of operating regions depicted in graph 600 represents an exemplary set the rules developed and implemented in defining and determining the control modes for the plurality of APLMs 110 (i.e., AC transient, DC, mixed AC transient and DC modes, and transition modes) based on $V_2$ and $V_1$ in modular power converter systems 100 and 200.

Figure 7:
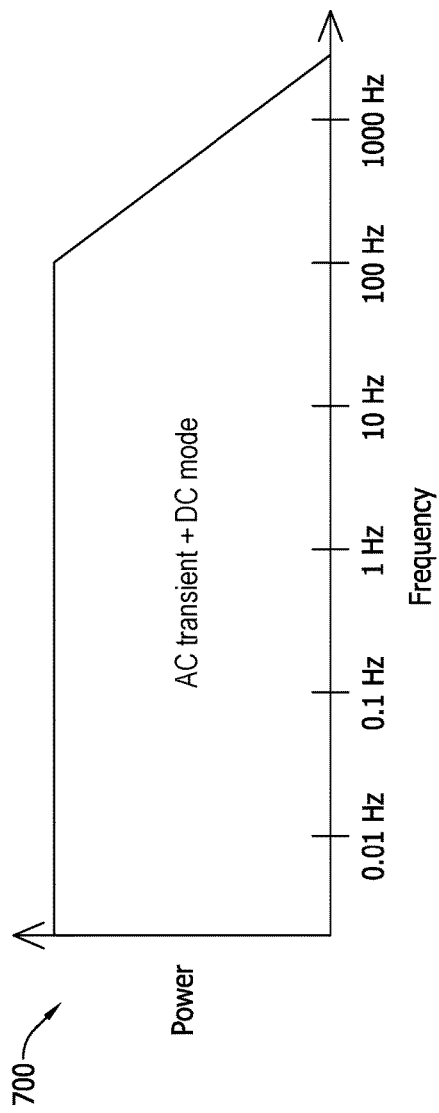
FIG. 7 is a graphical representation of operation in an alternating current (AC) transient and DC mode of the modular power converter systems shown in FIGS. 1 and 2.

FIG. 7 is a graphical representation, i.e., graph 700, of operation in an AC transient and DC mode of modular power converter system 100 and modular power converter system 200 (shown in FIGS. 1 and 2, respectively). In the exemplary embodiment, graph 700 depicts APLM 110 mode of operations as a function of $I_L$ current frequency (Hz, x-axis) and power profile (y-axis). EMS control schemes for modular power converter systems 100 and 200 utilize sensors 130 and 134, switching devices 302, 502, and 514, switching, switching controller 128, and converter controllers 528 and 532 to facilitate APLM 110 usage for balanced energy and power support for both AC transients and DC load components. Graph 700 thus depicts operation in the first operating region 602 (as shown and described above with reference to FIG. 6). As frequency of AC transient components of $I_L$ increases, the amount of power provided to electrical load device 126 by first-type ESD 102 relative to second-type ESD 310 decreases rapidly after 100 Hz. When the frequency of the AC transient components approaches 10 kHz, first-type ESD 102 provides little to no power to support electrical load device 126.

Figure 8:
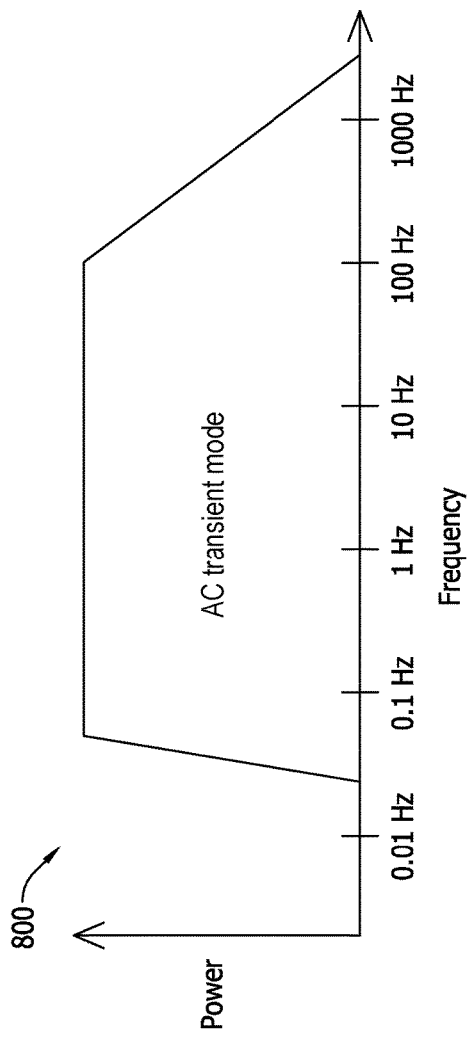
FIG. 8 is a graphical representation of operation in an AC transient mode of the modular power converter systems shown in FIGS. 1 and 2.

FIG. 8 is a graphical representation, i.e., graph 800, of operation in an AC transient mode of modular power converter system 100 and modular power converter system 200 (shown in FIGS. 1 and 2, respectively). In the exemplary embodiment, graph 800 depicts APLM 110 mode of operations as a function of $I_L$ current frequency (Hz, x-axis) and power profile (y-axis) in the first AC transient mode region 610. The proportion of electrical power supplied to electrical load device 126 by second-type ESD 310 rises rapidly after AC transient components reach a frequency of about 0.03 Hz, and between 0.03 Hz and 100 Hz, second-type ESD 310 predominantly supplies electrical power to electrical load device 126. After a frequency of 100 Hz, however, electrical power supplied by second-type ESD 310 declines until it supplies substantially no power after about 3000 Hz.

Figure 9:
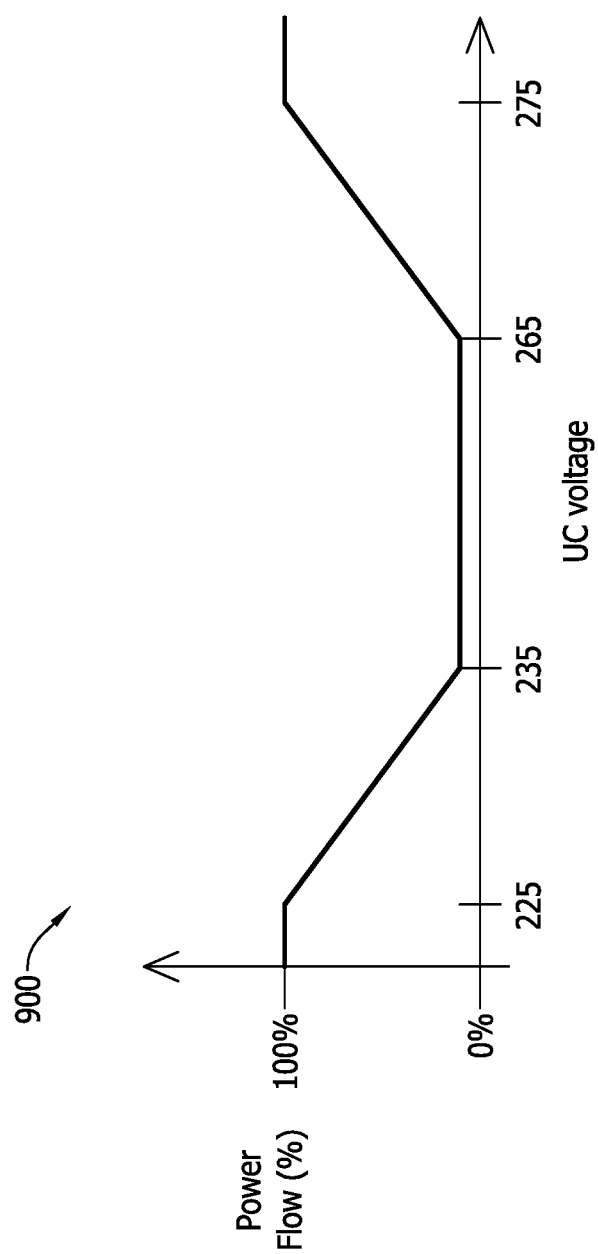
FIG. 9 is a graphical representation of operation of the modular power converter systems shown in FIGS. 1 and 2.

FIG. 9 is a graphical representation, i.e., graph 900, of operation of modular power converter system 100 and modular converter system 200 (shown in FIGS. 1 and 2, respectively). In the exemplary embodiment, graph 900 depicts power flow percentage (%), y-axis) from second-type ESD 310 $I_M$ current versus ultracapacitor voltage (i.e., $V_2$, x-axis) in modular power converter systems 100 and 200. With second-type ESD 310 maintained at an ultracapacitor voltage (i.e., $V_2$, x-axis) between 235 V and 265 V, electrical load device 126 operates in the first operating region 602 and draws $P_{avg}$ primarily from first-type ESD 102 (as shown and described above with reference to FIG. 6). For $V_2$<235 V and $V_2$>265 V, power flow to and from second-type ESD 310 ramps up gradually until representing the full amount of power flow in modular power converter systems 100 and 200 for $V_2$<225 V and $V_2$>275 V, respectively. Thus, in operation, in the exemplary embodiment, the EMS control scheme enables balanced utilization of APLM 110 and second-type ESD 310 to for efficient and proportional use of energy and power stored in first-type ESD 102 and second-type ESD 310 depending upon the power requirement of electrical load device 126 at any given instant in time. Efficient power and energy balance amongst the plurality of ESDs facilitates support of AC transients and DC components of electrical load device 126. To smooth the load-supporting transition between APLM 110 with second-type ESD 310 embodied in an ultracapacitor, and first-type ESD 102 embodied in at least one battery, a transition control scheme for battery current and power flow as a function of ultracapacitor voltage is depicted in graph 900. The transition control scheme depicted by graph 900 thus employs filter- and rule-based EMS algorithms that are straightforward and effective for implementation of a controls framework to lengthen battery life while reducing cost, size, and volume of the battery and overall energy storage system.

Figure 10:
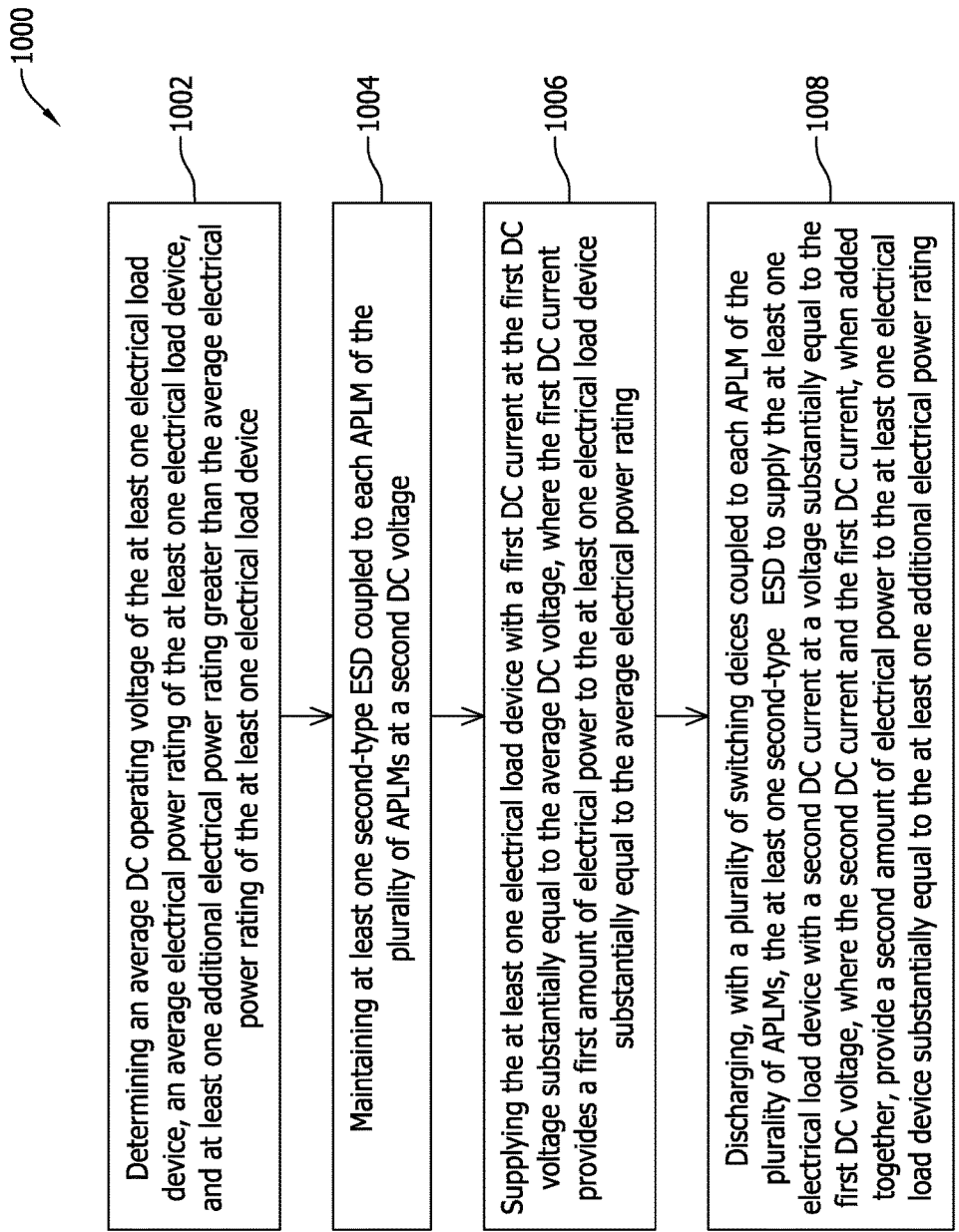
FIG. 10 is a flowchart diagram of an exemplary method of operating a modular power converter system that may be used with the modular power converter systems shown in FIGS. 1 and 2.

FIG. 10 is a flowchart diagram of an exemplary method 1000 of operating modular power converter system 100 and modular power converter system 200. In the exemplary embodiment, method 1000 includes determining 1002 an average DC operating voltage of electrical load device 126, an average electrical power rating of electrical load device 126, and at least one additional electrical power rating greater than the average electrical power rating of electrical load device 126. Method 1000 also includes maintaining 1004 second-type ESD 310 coupled to each APLM 110 of the plurality of APLMs 110 (i.e., of APLM string(s) 105) at $V_2$. Method 1000 further includes supplying 1006 electrical load device 126 with a first DC current, i.e., $I_L$, at $V_1$ substantially equal to the average DC voltage, where the first DC current provides a first amount of electrical power to electrical load device 126 substantially equal to the average electrical power rating. Method 1000 also includes discharging 1008, with the plurality of switching devices 302 coupled to each APLM 110 of the plurality of APLMs 110, the second-type ESD 310 to supply electrical load device 126 with a second DC current, i.e., $I_M$, at a voltage substantially equal to $V_1$, where the second DC current and the first DC current, i.e., $I_M+I_L$, when added together, provide a second amount of electrical power electrical load device 126 substantially equal to the at least one additional electrical power rating.

The above-described systems and methods for integrating hybrid ESDs into DC power systems enable functional integration of MMC-like power electronics into ESDs such as ultracapacitors for applications in a wide range of DC power system operating voltages. The above-described embodiments also provide a modular, building block-based system which enables scalability and redundancy, and high efficiency and fault tolerant operation in both centralized and distributed power conversion applications. The above-described embodiments further facilitate use of simplified control schemes for EMS based on current and power profiles of supported electrical loads. The above-described systems and methods for integrating hybrid ESDs into DC power systems also provide a high efficiency power converter having improved specific power density, less design and development time and expense, and reduced NRE and other operating costs relative to known systems.

An exemplary technical effect of the above-described systems and methods for integrating hybrid ESDs into DC power systems includes at least one of the following: (a) enabling functional integration of MMC-like power electronics into ESDs such as ultracapacitors for applications in a wide range of DC power system operating voltages; (b) providing a modular, building block-based system enabling scalability and redundancy, and high efficiency and fault tolerant operation in both centralized and distributed power conversion applications; (c) facilitating use of simplified control schemes for EMS based on current and power profiles of supported electrical loads; and (d) providing a high efficiency power converter having improved specific power density, less design and development time and expense, and reduced NRE and other operating costs relative to known systems.

Exemplary embodiments of systems and methods for integrating hybrid ESDs into DC power systems, and methods of operating such systems and devices are not limited to the specific embodiments described herein, but rather, components of systems and/or steps of the methods may be utilized independently and separately from other components and/or steps described herein. For example, the systems may also be used in combination with other systems requiring modularity, scalability, and redundancy, and the associated methods, and are not limited to practice with only the systems and methods for integrating hybrid ESDs into DC power systems as described herein. Rather, the exemplary embodiment can be implemented and utilized in connection with many other power systems applications that are currently configured to provide high efficiency DC power conversion, e.g., and without limitation, power systems in renewable energy generation facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modular power conversion device comprising:
   at least one first-type energy storage device (ESD) configured to induce a first direct current (DC) voltage;
   at least one active power link module (APLM) string coupled to said at least one first-type ESD, said at least one APLM string comprising a plurality of APLMs coupled to each other, each APLM of said plurality of APLMs comprising:
   a plurality of switching devices comprising a first switching device and a second switching device coupled to each other in electrical series; and
   at least one second-type ESD coupled in electrical parallel with both of said first switching device and said second switching device, said at least one second-type ESD configured to induce a second DC voltage; and
   a high-frequency (HF) DC-to-DC converter coupled to said at least one APLM string and configured to convert the first DC voltage.

2. The modular power conversion device in accordance with claim 1, wherein said at least one APLM string is further coupled in electrical parallel to said at least one first-type ESD.

3. The modular power conversion device in accordance with claim 1, wherein said at least one first-type ESD comprises at least one of a battery, an ultracapacitor, a film capacitor, an electrolytic capacitor, a rotating energy storage device, and a fuel cell, and wherein said at least one second-type ESD comprises at least one of a battery, an ultracapacitor, a film capacitor, an electrolytic capacitor, a rotating energy storage device, and a fuel cell.

4. The modular power conversion device in accordance with claim 1, wherein both of said at least one first-type ESD and said at least one second-type ESD comprise at least one of a battery, an ultracapacitor, a film capacitor, an electrolytic capacitor, a rotating energy storage device, and a fuel cell.

5. The modular power conversion device in accordance with claim 1 further comprising a bypass switch coupled in electrical parallel with at least one switching device of said plurality of switching devices, said bypass switch configured to alternately electrically couple and electrically isolate at least one APLM of said plurality of APLMs and said modular power conversion device.

6. The modular power conversion device in accordance with claim 5 further comprising a bypass controller coupled to said bypass switch, said bypass controller configured to transmit a bypass control signal to alternately open and close said bypass switch.

7. The modular power conversion device in accordance with claim 1 further comprising a switching controller coupled to said plurality of switching devices, said switching controller configured to transmit at least one switch control signal to alternately open and close at least one of said plurality of switching devices.

8. The modular power conversion device in accordance with claim 1 further comprising:
a first DC bus coupled in electrical parallel with at least one of said first-type ESD and said at least one APLM string, said first DC bus having a voltage substantially equal to the first DC voltage; and
a second DC bus, and wherein said high-frequency (HF) DC-to-DC converter is coupled to said first DC bus and is coupled to said second DC bus, and wherein said HF DC-to-DC converter is configured to:
inductively couple said first DC bus to said second DC bus; and
convert the first DC voltage to a third DC voltage, said second DC bus having a voltage substantially equal to the third voltage.

9. The modular power conversion device in accordance with claim 8, wherein:
said at least one first-type ESD is further coupled in electrical parallel with said first DC bus; and
said at least one APLM string is further coupled in electrical parallel with said second DC bus, wherein said at least one first-type ESD is:
galvanically isolated from said at least one APLM string; and
inductively coupled to said at least one APLM string.

10. The modular power conversion device in accordance with claim 8, wherein said HF DC-to-DC converter comprises at least one converter pair comprising:
at least one DC-to-alternating current (AC) converter comprising a primary winding, said at least one DC-to-AC converter coupled to said first DC bus; and
at least one AC-to-DC converter comprising a secondary winding, said at least one AC-to-DC converter coupled to said second DC bus, wherein said primary winding is:
galvanically isolated from said secondary winding; and
inductively coupled to said secondary winding.

11. The modular power conversion device in accordance with claim 10, wherein said primary winding has a first number of turns and said secondary winding has a second number of turns, the first number of turns different from the second number of turns, and wherein the first DC voltage is different from the third DC voltage.

12. The modular power conversion device in accordance with claim 10, wherein said at least one converter pair further comprises a plurality of converter pairs, wherein:
said at least one DC-to-AC converter comprises a plurality of DC-to-AC converters coupled together in electrical parallel with said first DC bus; and
said at least one AC-to-DC converter comprises a plurality of AC-to-DC converters coupled together in electrical series and further coupled in electrical parallel with said second DC bus, wherein the first DC voltage is different from the third DC voltage.

13. The modular power conversion device in accordance with claim 10, wherein:
said at least one DC-to-AC converter comprises a first plurality of switching devices;
said at least one AC-to-DC converter comprises a second plurality of switching devices; and
at least one converter controller coupled to said first plurality of switching devices and coupled to said second plurality of switching devices, said at least one converter controller configured to transmit at least one converter control signal to alternately open and close said first plurality of switching devices and said second plurality of switching devices.

14. A modular power converter system comprising:
a modular power conversion device comprising:
at least one first-type energy storage device (ESD) configured to induce a first direct current (DC) voltage; and
at least one active power link module (APLM) string coupled to said at least one first-type ESD, said at least one APLM string comprising a plurality of APLMs coupled to each other, each APLM of said plurality of APLMs comprising:
a plurality of switching devices comprising a first switching device and a second switching device coupled to each other in electrical series; and
at least one second-type ESD coupled in electrical parallel with both of said first switching device and said second switching device, said at least one at least one second-type ESD configured to induce a second DC voltage; and
at least one electrical load device coupled in electrical parallel to:
said modular power conversion device; and
said at least one first-type ESD, wherein said at least one electrical load device is further galvanically coupled to said modular power conversion device.

15. The modular power converter system in accordance with claim 14, wherein said each APLM of said plurality of APLMs further comprises a replaceable module detachably and electrically coupled to said at least one APLM string.

16. The modular power converter system in accordance with claim 14, wherein said at least one APLM string is further coupled in electrical parallel to said at least one first-type ESD.

17. The modular power converter system in accordance with claim 14 further comprising:
a first DC bus having a voltage substantially equal to the first DC voltage;
a second DC bus; and
a high-frequency (HF) DC-to-DC converter coupled to said first DC bus and said second DC bus, said HF DC-to-DC converter configured to:
inductively couple said first DC bus to said second DC bus; and
convert the first DC voltage to a third DC voltage, said second DC bus having a voltage substantially equal to the third voltage, wherein said at least one electrical load device is coupled to at least one of said first DC bus and said second DC bus.

18. The modular power converter system in accordance with claim 17, wherein said at least one APLM string is coupled in electrical parallel to at least one of said first DC bus and said second DC bus, and wherein said at least one first-type ESD is coupled in electrical parallel to at least one of said first DC bus and said second DC bus.

19. The modular power converter system in accordance with claim 17 further comprising at least one power source coupled in electrical parallel to at least one of said first DC bus and said second DC bus.

20. A method of operating a modular power converter system including at least one first-type energy storage device (ESD) configured to induce a first direct current (DC) voltage, a plurality of active power link modules (APLMs) coupled to the at least one first-type ESD, and at least one electrical load device coupled to the plurality of APLMs and coupled to the at least one first-type ESD, said method comprising:
   determining an average DC operating voltage of the at least one electrical load device, an average electrical power rating of the at least one electrical load device, and at least one additional electrical power rating greater than the average electrical power rating of the at least one electrical load device;
   maintaining at least one second-type ESD coupled to each APLM of the plurality of APLMs at a second DC voltage;
   supplying the at least one electrical load device with a first DC current at the first DC voltage substantially equal to the average DC voltage, wherein the first DC current provides a first amount of electrical power to the at least one electrical load device substantially equal to the average electrical power rating; and
   discharging, with a plurality of switching devices coupled to each APLM of the plurality of APLMs, the at least one second-type ESD to supply the at least one electrical load device with a second DC current at a voltage substantially equal to the first DC voltage, wherein the second DC current and the first DC current, when added together, provide a second amount of electrical power to the at least one electrical load device substantially equal to the at least one additional electrical power rating.

21. The method in accordance with claim 20 further comprising:
   detecting, with at least one sensor coupled to a switching controller, a load current through the at least one electrical load device; and
   transmitting, with the switching controller, at least one switch control signal to the plurality of switching devices to establish a plurality of switching states of the plurality of switching devices, the plurality of switching states including:
      a first switching state, wherein the load current is substantially equal to an average DC current, the first switching state configured to at least one of maintain the at least one second-type ESD at the second DC voltage and charge the at least one second-ESD to the second DC voltage; and
      a second switching state different from the first switching state, wherein the load current exceeds the average DC current by a predetermined amount, the second switching state configured to discharge the at least one second-ESD.

22. The method in accordance with claim 20, wherein the modular power converter system further includes a first DC bus coupled to at least one of the at least one first-type ESD and the plurality of APLMs, a second DC bus coupled to the at least one electrical load device, and a high-frequency (HF) DC-to-DC converter coupled to the first DC bus and the second DC bus, said method further comprising:
   galvanically isolating the first DC bus from the second DC bus;
   inductively coupling the first DC bus to the second DC bus; and
   converting the first DC voltage to a third DC voltage, the second DC bus having a voltage substantially equal to the third DC voltage.

23. The method in accordance with claim 22, wherein the HF DC-to-DC converter includes a first plurality of switching devices galvanically isolated from a second plurality of switching devices, and wherein converting the first DC voltage to a third DC voltage comprises:
   determining a first switching frequency of the first plurality of switching devices and a second switching frequency of the second plurality of switching devices; and
   transmitting, with a converter controller coupled to the first plurality of switching devices and coupled to the second plurality of switching devices, a converter control signal to alternately open and close the first plurality of switching devices and the second plurality of switching devices.

24. The method in accordance with claim 20, wherein each APLM of the plurality of APLMs includes a bypass switch coupled in electrical parallel with at least one switching device of the plurality of switching devices, said method further comprising:
   determining an operational status including a functional status and a non-functional status of at least one APLM of the plurality of APLMs;
   receiving, at a bypass controller coupled to the bypass switch, a status signal representative of the operational status; and
   transmitting, with the bypass controller, a bypass control signal to alternately open and close the bypass switch when the at least one APLM has the functional status and the non-functional status, respectively, to alternately electrically couple and electrically isolate the at least one second-type ESD from the modular power converter system.

\* \* \* \* \*